United States Patent
Chae

(10) Patent No.: US 8,900,735 B2
(45) Date of Patent: Dec. 2, 2014

(54) DEVICE FOR ADJUSTING DEVIATION OF HEIGHT AND HORIZONTALITY

(71) Applicant: LG Chem, Ltd., Seoul (KR)

(72) Inventor: Seung Hun Chae, Cheongwon-gun (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/930,509

(22) Filed: Jun. 28, 2013

(65) Prior Publication Data

US 2013/0288108 A1    Oct. 31, 2013

Related U.S. Application Data

(63) Continuation of application No. PCT/KR2011/008924, filed on Nov. 22, 2011.

(30) Foreign Application Priority Data

Dec. 29, 2010    (KR) .................. 10-2010-0138099

(51) Int. Cl.
  *H01M 2/04*    (2006.01)
  *F16H 25/08*    (2006.01)
  *F16M 11/04*    (2006.01)
  *F16M 11/12*    (2006.01)
  *F16M 11/18*    (2006.01)

(52) U.S. Cl.
  CPC ............ *F16H 25/08* (2013.01); *F16M 11/046* (2013.01); *F16M 11/121* (2013.01); *F16M 11/125* (2013.01); *F16M 11/18* (2013.01); *H01M 2/04* (2013.01)
  USPC .......................................... 429/64; 29/623.2

(58) Field of Classification Search
  CPC ............... H01L 2224/78344; B30B 1/261; B30B 1/263; B30B 1/26; F16H 2024/2075; F16H 2063/3056; F16H 25/10; F16H 53/06; F16H 63/30
  USPC .......................... 429/64; 29/623.2; 74/25, 55
  See application file for complete search history.

(56) References Cited

U.S. PATENT DOCUMENTS

| 3,614,909 A | * | 10/1971 | Rolf-Dieter Neuser | ...... 409/248 |
| 6,505,659 B1 | * | 1/2003 | Hummel | ............ 144/135.2 |
| 2004/0168497 A1 | * | 9/2004 | Knight et al. | ............ 72/105 |

FOREIGN PATENT DOCUMENTS

| JP | 56-128028 U | 9/1981 |
| JP | 10-058356 A | 3/1998 |

(Continued)

OTHER PUBLICATIONS

International Search Report issued in PCT/KR2011/008924, mailed on Jun. 28, 2012.

*Primary Examiner* — Mark F Huff
*Assistant Examiner* — Monique Wills
(74) *Attorney, Agent, or Firm* — Birch, Stewart, Kolasch & Birch, LLP

(57) ABSTRACT

Disclosed herein is a device for simultaneously adjusting vertical height and horizontal deflection including a lower plate fixed to a floor, an upper plate, vertical height and horizontal deflection of which are adjusted, one or more variable posts connected to an upper end of the lower plate and a lower end of the upper plate, and a height adjustment unit, a lower end of which is fixedly disposed above the lower plate and an upper end of which is disposed at the lower end of the upper plate in a line contact fashion, the height adjustment unit adjusting vertical height and horizontal deflection of the upper plate at the line contact portion.

17 Claims, 5 Drawing Sheets

(56) References Cited

FOREIGN PATENT DOCUMENTS

| | | |
|---|---|---|
| JP | 2000-246865 A | 9/2000 |
| JP | 2004-220940 A | 8/2004 |
| JP | 2006-192522 A | 7/2006 |
| KR | 1998-075540 A | 11/1998 |
| KR | 1999-001540 A | 1/1999 |
| KR | 10-0500568 B1 | 7/2005 |

* cited by examiner

DEVICE FOR ADJUSTING DEVIATION OF HEIGHT AND HORIZONTALITY Cross Reference to Related Applications:

This application is a Bypass Continuation of PCT International Application No. PCT/KR2011/008924 filed on Nov. 22, 2011, which claims priority under 35 U.S.C §119(a) to Patent Application No. 10-2010-0138099 filed in the Republic of Korea on Dec. 29, 2010, all of which are hereby expressly incorporated by reference into the present application.

TECHNICAL FIELD

The present invention relates to a device for adjusting vertical height and horizontal deflection and, more particularly, to a device for adjusting vertical height and horizontal deflection including a lower plate fixed to a floor, an upper plate, vertical height and horizontal deflection of which are adjusted, one or more variable posts connected to an upper end of the lower plate and a lower end of the upper plate, and a height adjustment unit, a lower end of which is fixedly disposed above the lower plate and an upper end of which is disposed at the lower end of the upper plate in a line contact fashion, the height adjustment unit adjusting vertical height and horizontal deflection of the upper plate at the line contact portion.

BACKGROUND ART

Generally, in a case in which a desired product is processed using machinery or equipment, horizontality of a reference element is very important. For machinery or equipment requiring precision, it is difficult to adjust vertical deflection and, in addition, considerable time is required.

A device for adjusting height and horizontal deflection to provide accurate horizontality is used in a variety of fields. One example of an application of such a device for adjusting height and horizontal deflection is in manufacture of cylindrical secondary batteries.

A cylindrical secondary battery is configured to have a structure in which an electrode assembly (jelly-roll) of a cathode/separator/anode structure is mounted in a cylindrical metal container. An exemplary vertical sectional view of the cylindrical secondary battery is shown in FIG. 1.

Referring to FIG. 1, a cylindrical battery 10 generally includes a cylindrical container 20, a jelly-roll type electrode assembly 30 mounted in the container 20, a cap assembly coupled to the upper part of the container 20, a beading part 21 for mounting the cap assembly 40, and a crimping unit 50 for sealing the battery.

The electrode assembly 30 is configured to have a structure in which a cathode 31 and an anode 32 are wound in a jelly-roll shape while a separator 33 is interposed between the cathode 31 and the anode 32. To the cathode 31 is attached a cathode tab 34, which is connected to the cap assembly 40. To the anode 32 is attached an anode tab (not shown), which is connected to the lower end of the container 20.

The cap assembly 40 includes a top cap 41 constituting a cathode terminal, a positive temperature coefficient (PTC) element 42 for intercepting electric current when the interior temperature of the battery is increased by detecting extreme increase in battery resistance, a safety vent 43 for intercepting electric current and/or exhaust gas when the interior pressure of the battery is increased, an insulating member 44 for electrically isolating the safety vent 43 from a cap plate 45 excluding a specific portion, and the cap plate 45, to which the cathode tab 34 coupled to the cathode 31 is connected. The cap assembly 40 is configured to have a structure in which the top cap 41, the PTC element 42, the safety vent 43, the insulating member 44, and the cap plate 45 are sequentially stacked. The cap assembly 40 is mounted on the beading part 21 formed internally by beading the upper end of the container 20 in a state in which a gasket 60 is mounted at the cap assembly.

In addition, such a cylindrical battery is manufactured by inserting a jelly-roll type electrode assembly into a cylindrical container, forming a beading part at a portion of the container corresponding to an upper end outer circumference of the jelly-roll type electrode assembly, mounting a cap assembly in which a gasket is disposed, and crimping the upper end of the container.

In a process of beading the upper end of the cylindrical container as described above, it is necessary to adjust the height of a worktable when a mold for the cylindrical battery is replaced such that height of the worktable is suited to the mold as needed. In addition, during a beading process, a beading knife approaches the cylindrical container from one side during the rotation of the cylindrical container to form an inwardly depressed beading part at the inside of the container. In a case in which horizontal deflection occurs, therefore, the beading part is not uniformly formed.

An exemplary structure of a conventional height adjusting device mainly used in a process of forming a beading part at such a cylindrical container is typically shown in FIG. 2.

Referring to FIG. 2, the height adjusting device 200 includes an upper plate 100, a lower plate 110, three posts 120, and fixing nuts 130 for fixing the posts 120 to the upper plate and the lower plate.

In the height adjusting device 200 of FIG. 2, however, it is not possible to check height deflection in real time when height deflection of the upper plate 100 is adjusted. In addition, during adjustment of the height deflection of the upper plate, it is necessary to frequently check the height of the upper plate 100. As a result, adjustment time is increased. Furthermore, the posts 1120 are individually adjusted.

In addition, adjustment of one post affects heights of other posts. In a case in which the posts 120 are fixed to the upper plate and the lower plate using the fixing nuts 130, heights of the posts 120 are irregularly changed with the result that it is not possible to achieve desired horizontality of the upper plate.

Consequently, there is a high necessity for a height adjustment device that is capable of fundamentally solving the above problems.

Disclosure

Technical Problem

The present invention has been made to solve the above-mentioned problems, and other technical problems that have yet to be resolved.

As a result of a variety of extensive and intensive studies and experiments to solve the problems as described above, the inventors of the present application have developed a device that is capable of simultaneously adjusting vertical height and horizontal deflection using a height adjustment unit having a specific structure, as will hereinafter be described. The present invention has been completed based on such development.

Therefore, it is an object of the present invention to provide a device for adjusting vertical height and horizontal deflection having a specific structure that is capable of optimally adjusting vertical height and horizontal deflection of the device, thereby minimizing height deflection adjustment time and providing manufactured products of uniform quality.

Technical Solution

In accordance with one aspect of the present invention, the above and other objects can be accomplished by the provision of a device for simultaneously adjusting vertical height and horizontal deflection including a lower plate fixed to a floor, an upper plate, vertical height and horizontal deflection of which are adjusted, one or more variable posts connected to an upper end of the lower plate and a lower end of the upper plate, and a height adjustment unit, a lower end of which is fixedly disposed above the lower plate and an upper end of which is disposed at the lower end of the upper plate in a line contact fashion, the height adjustment unit adjusting vertical height and horizontal deflection of the upper plate at the line contact portion.

In the device for adjusting vertical height and horizontal deflection according to the present invention, therefore, horizontal deflection of the upper plate as well as height of the upper plate is adjusted based on line contact through manipulation of the height adjustment unit alone. Consequently, it is possible to reduce time required to adjust vertical height and horizontality and to improve operation accuracy as compared with the conventional height adjustment device.

In addition, in the device for adjusting vertical height and horizontal deflection, it is possible to easily perform a horizontality adjustment process in maximum consideration of worker convenience and, at the same time, to obtain desired horizontality within a short time.

The number of the variable posts is not particularly restricted so long as the variable posts stably can support the upper plate. In order to reduce horizontal deflection, however, one or more variable posts are preferably mounted around the height adjustment unit at each side of the height adjustment unit.

For example, one or two variable posts may be mounted around the height adjustment unit at each side of the height adjustment unit.

In a preferred example, each variable post may further include a fixing part for fixing height of a corresponding portion of the upper plate changed by the height adjustment unit.

When the upper plate reaches a desired height by the height adjustment unit, therefore, the variable posts are fixed by the corresponding fixing parts such that the height of the upper plate is not changed. As a result, it is possible to stably perform a predetermined process, such as a beading process of a cylindrical container, on the upper plate.

The structure of the fixing parts is not particularly restricted so long as the fixing parts can easily fix the corresponding variable posts. For example, each fixing part may be a clamp lock mounted to a lower end of a corresponding one of the variable posts adjacent to the lower plate.

Specifically, the clamp lock is preferable because height deflection does not occur when fastening the clamp lock as compared with a nut lock which changes height when fastening the nut lock.

In a preferred example, the height adjustment unit may include a pair of support parts fixed to a top of the lower plate in a frontward and rearward direction, a polygonal hinge part disposed between the support parts, an eccentric cam mounted to have a structure for connecting a lower angular point of the hinge part and the support parts, the eccentric cam inducing vertical movement of the hinge part and change in height of free rotary parts during rotation of the eccentric cam, and two pairs of free rotary parts mounted at upper angular points of the hinge part, the free rotary parts being disposed at the upper plate in a line contact fashion.

The shape of the hinge part is not particularly restricted so long as the hinge part is formed in a polygonal shape in section while satisfying the above conditions. For example, the hinge part may be formed in an inverse-triangular shape, a quadrangular shape, or a pentagonal shape.

In the above structure, the eccentric cam may be configured to have, for example, a structure including a follower link, bearings, and a shaft.

For reference, a cam is a rotating and sliding piece in a mechanical linkage used especially in transforming a rotational motion into a rectilinear motion. When the shaft is rotated, a portion of the eccentric cam connected to the follower link is moved vertically and/or horizontally through a combination of the shaft and the follower link having a center eccentric from a rotational center of the shaft in one direction.

Since the follower link is connected to the lower angular point of the hinge part of the height adjustment unit, the hinge part is vertically moved as the shaft of the eccentric cam is rotated. The vertical movement distance of the hinge part is twice the central distance between the follower link and the shaft of the eccentric cam. On the other hand, the vertical movement distance of the hinge part may be variously set as needed. For example, in a case in which the central distance between the follower link and the shaft of the eccentric cam is 1 mm, the vertical movement distance of the hinge part may be set to the height difference between the top dead point and the bottom dead point, that is, 2 mm.

In addition, since the hinge part and the follower link are integrated without an additional joint member in the above structure of the eccentric cam, it is possible to induce the motion of the hinge part as a circular movement instead of a vertical linear reciprocation. The hinge part is maintained in an inverse-triangular shape irrespective of the position thereof due to the bearings disposed between the hinge part and the follower link. Consequently, it is possible to easily achieve a vertical movement of the hinge part.

Preferably, a driving handle is further mounted at the eccentric cam. Consequently, it is possible for a worker to rotate of the shaft of the eccentric cam through manipulation of the driving handle, thereby easily achieving vertical height and horizontal deflection adjustment of the upper plate.

The structure of the driving handle is not particularly restricted so long as the driving handle can easily drive the eccentric cam. Preferably, the driving handle is connected to the shaft of the eccentric cam via a worm and a worm gear.

As described above, the height adjustment unit includes the hinge part and the bearing structure. Consequently, it is possible to adjust height and horizontal deflection of specific portions through manipulation of the driving handle and to perform micro adjustment through the worm gear and the shaft of the eccentric cam, thereby improving accuracy in vertical height and horizontal deflection of the upper plate.

Preferably, in the above structure, the driving handle makes more than one rotation when the shaft of the eccentric cam makes one rotation. That is, a reduction ratio of the worm to the worm gear (the number of rotations of the shaft of the eccentric cam/the number of rotations of the driving handle) is preferably less than 1. As the reduction ratio of the worm to the worm gear is decreased, a rotational angle of the shaft of the eccentric cam per rotation of the driving handle is decreased. Consequently, more precise manipulation may be performed. If the reduction ratio of the worm to the worm gear is excessively decreased, however, driving time is increased. For this reason, the reduction ratio of the worm to the worm gear is preferably 1/5 to 1/50.

In a preferred example, each free rotary part may include a pair of bearings disposed at the lower end of the upper plate in a contact fashion and a shaft for connecting the bearings to the upper angular points of the hinge part.

Consequently, each free rotary part contacts the upper plate via the bearing in a line contact fashion. In a case in which the eccentric cam of the height adjustment unit is rotated as described above, therefore, the upper plate is vertically reciprocated in response thereto.

Meanwhile, the device for adjusting vertical height and horizontal deflection may further include one or more gauges mounted at opposite sides of the height adjustment unit to indicate height of the upper plate at portions at which the gauges are mounted.

In this structure, it is possible for a worker to control the height adjustment unit while checking the height of the upper plate in real time through the gauges and to check horizontal deflection in real time even during control, thereby improving adjustment accuracy.

In the above structure, one gauge may be mounted around the height adjustment unit at each side of the height adjustment unit. Consequently, it is possible to easily adjust heights of the variable posts while checking horizontal deflection through the dimensional difference between the gauges located at the opposite sides of the height adjustment unit.

In a concrete example, the device for adjusting vertical height and horizontal deflection according to the present invention may be configured to have a structure in which a variable post ($P_L$) and a gauge ($G_L$) are located at a left side of the height adjustment unit and a variable post ($P_R$) and a gauge ($G_R$) are located at a right side of the height adjustment unit.

In the above structure, in a case in which it is necessary to change a height ($H_p$) of the upper plate to a set height ($H_a$) without horizontal deflection, the height adjustment unit may be adjusted to change height of the variable post ($P_L$) such that height indicated by the gauge ($G_L$) becomes the set height ($H_a$) and then the variable post ($P_L$) may be fixed and, subsequently, the height adjustment unit may be adjusted again to change height of the variable post ($P_R$) such that height indicated by the gauge ($G_R$) becomes the set height ($H_a$) and then the variable post ($P_R$) may be fixed.

For example, a process of adjusting vertical height and horizontal deflection of the upper plate through manipulation of the driving handle may include a step of manipulating the driving handle until one of the left and right gauges indicates the set height, a step of fixing height of one variable post corresponding to the gauge indicating the set height, a step of manipulating the driving handle until the other gauge indicates the set height, and a step of fixing the height of the other variable post.

In addition, since the follower link of the eccentric cam is integrally connected to the hinge part via the bearings as previously described, a vertical rectilinear motion is not performed but a vertical motion through a circular motion is performed. Additionally, the upper end of the hinge part is connected to the upper plate via the free rotary parts in a line contact fashion. Even in a case in which one of the variable posts is fixed, the free rotary parts are rotated according to a motion of the hinge part to adjust the height of a non-fixed portion of the upper plate.

Furthermore, the gauges are mounted so as to correspond to the left and right variable posts and, therefore, it is possible to adjust heights of the opposite sides of the upper plate while directly checking the heights of the opposite sides of the upper plate with the naked eye.

The structure of each gauge is not particularly restricted so long as the gauge can easily indicate height of the upper plate. For example, each gauge may be a dial gauge. In a case in which the dial gauge is used, it is possible to more easily check height and horizontal deflection of the upper plate than when using a digital gauge.

A lower end of each gauge may be fixed to the upper plate and a load unit may be connected to the lower plate. Specifically, tension of the load unit is changed based on height of the upper plate, and the gauge measures the tension of the load unit to indicate the height of the upper plate.

According to circumstances, the lower end of the gauge may be inserted through a through hole of the upper plate such that the lower end of the gauge is connected to the upper end of the load unit.

In accordance with another aspect of the present invention, there is provided a beading process system for manufacturing a cylindrical battery including the device for adjusting vertical height and horizontal deflection with the above-stated construction and a beading device placed at the top of the upper plate of the device for adjusting vertical height and horizontal deflection to fix beading of the cylindrical battery.

For example, the beading process system for manufacturing the cylindrical battery may include a) a process of inserting a jelly-roll into a cylindrical container, b) a beading process of forming a beading part at the upper end of the container, c) a sizing process of reducing the width of the beading part simultaneously with the beading process or following the beading process, d) an electrolyte injection process of injecting an electrolyte into the container, e) a cap assembly process of mounting a cap assembly to the upper end of the beading part, and f) a crimping process of crimping the upper end of the container to seal the interior of the container.

For example, the beading process may include b-1) a step of rotating the cylindrical container at predetermined speed, b-2) a step of pressing a beading device against the outer circumference of the container at predetermined speed during rotation of the container to elongate the container and thus form a beading part, and b-3) a step of pressing the cylindrical container having the beading part in the longitudinal direction.

In accordance with a further aspect of the present invention, there is provided a cylindrical battery manufactured using the beading process system.

The cylindrical battery may be a lithium secondary battery exhibiting high energy density, discharge voltage, and output stability. Other components of the lithium secondary battery according to the present invention will hereinafter be described in detail.

Generally, the lithium secondary battery includes a cathode, an anode, a separator, and a non-aqueous electrolytic solution containing lithium salt.

The cathode may be manufactured, for example, by applying a mixture of a cathode active material, a conductive material, and a binder to a cathode current collector and drying the applied mixture. A filler may be further added as needed. On the other hand, the anode may be manufactured by applying an anode material to an anode current collector and drying the applied anode material. The above-mentioned ingredients may be further included as needed.

The separator is disposed between the anode and the cathode. The separator may be formed of an insulative thin film exhibiting high ion permeability and mechanical strength.

The non-aqueous electrolytic solution containing lithium salt consists of a non-aqueous electrolyte and lithium salt. A liquid non-aqueous electrolytic solution, a solid electrolyte, or an inorganic solid electrolyte may be used as the non-aqueous electrolyte.

The current collectors, the electrode active materials, the conductive material, the binder, the filler, the separator, the electrolytic solution, and the lithium salt are well known in the art to which the present invention pertains and therefore, a detailed description thereof will be omitted.

The lithium secondary battery according to the present invention may be manufactured using an ordinary method well known in the art to which the present invention pertains. That is, the lithium secondary battery may be manufactured by disposing a porous separator between a cathode and an anode and injecting an electrolytic solution thereinto.

The cathode may be manufactured, for example, by applying a slurry consisting of a lithium transition metal oxide active material, a conductive material, and a binder to a current collector and drying the slurry. In the same manner, the anode may be manufactured, for example, by applying a slurry consisting of a carbon active material, a conductive material, and a binder to a thin current collector and drying the slurry.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
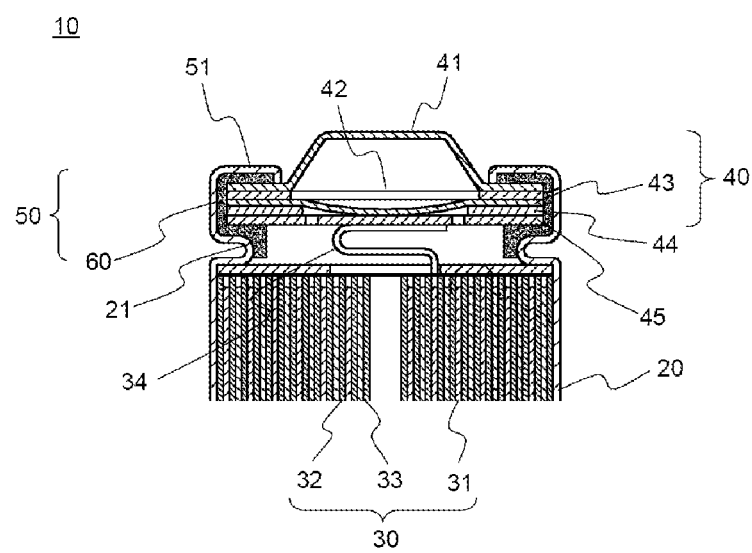
FIG. 1 is a vertical sectional view showing a cylindrical battery.
Figure 2:
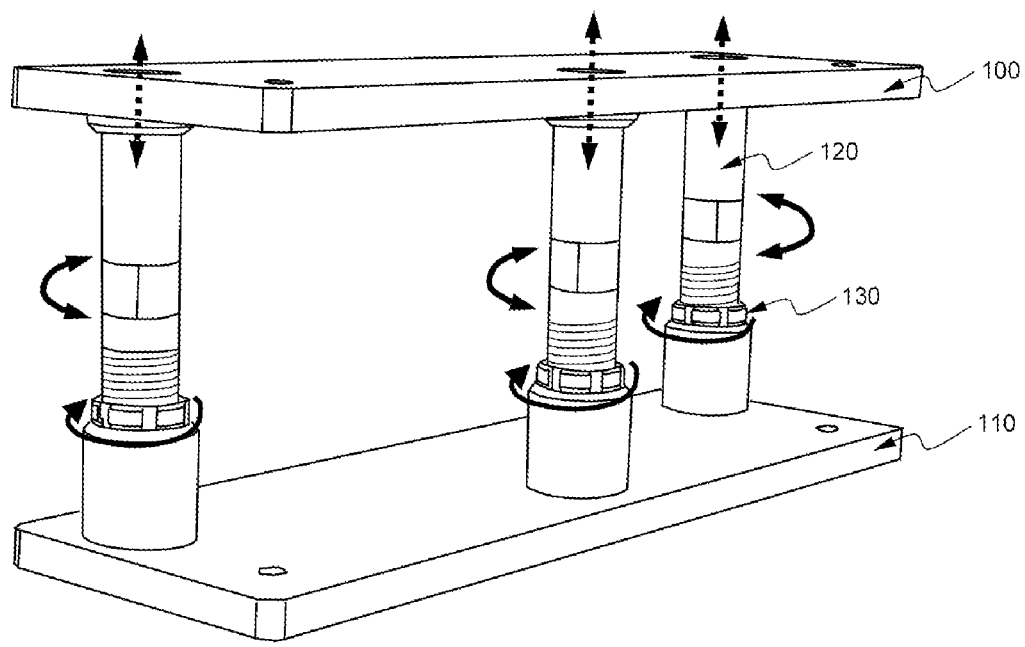
FIG. 2 is a perspective view showing a conventional height adjustment device.
Figure 3:
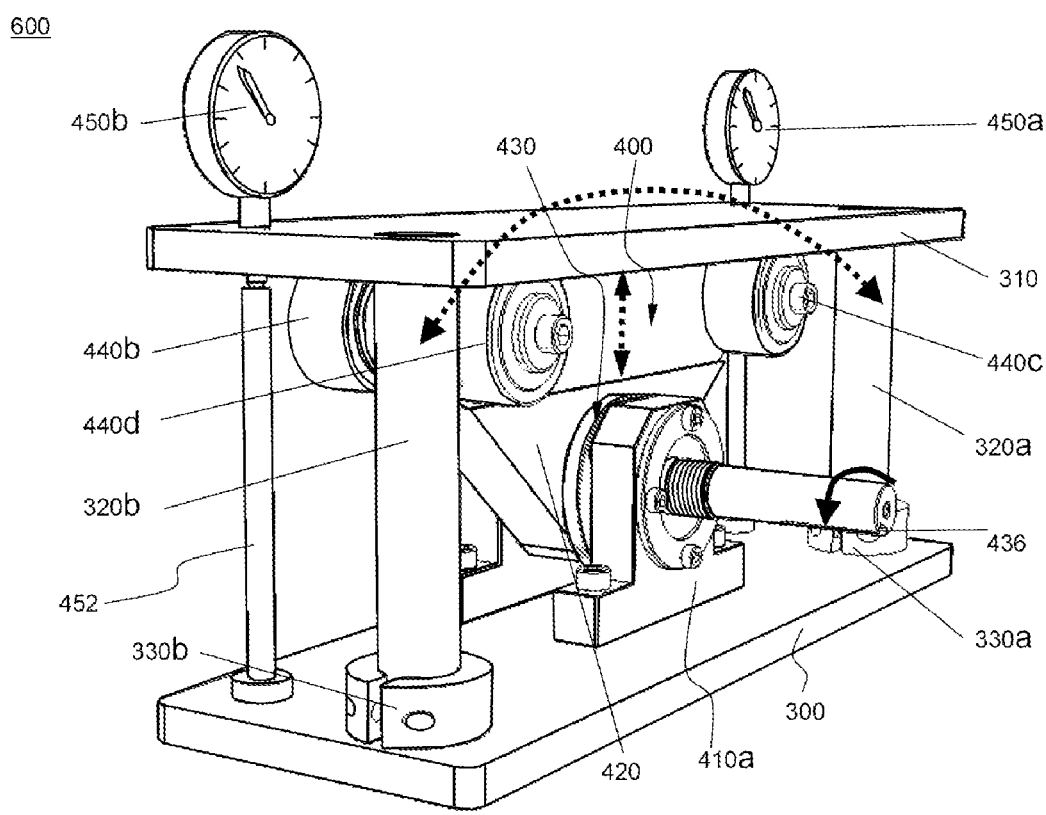
FIG. 3 is a perspective view showing a device for adjusting vertical height and horizontal deflection according to an embodiment of the present invention.
Figure 4:
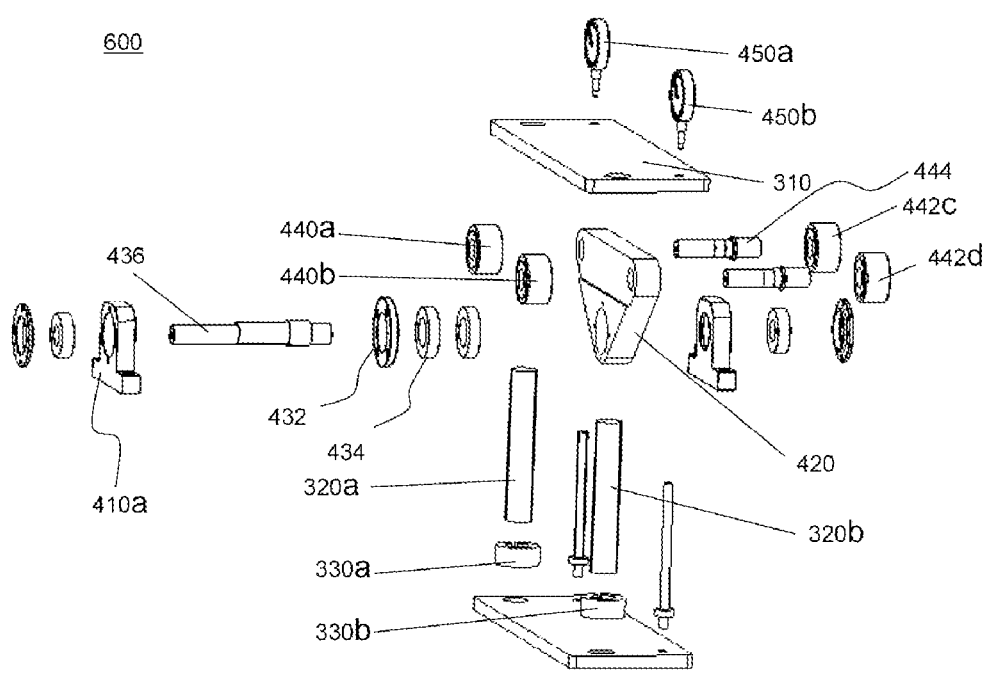
FIG. 4 is an exploded view showing the device for adjusting vertical height and horizontal deflection of FIG. 3.

FIG. 3 is a perspective view typically showing a device for adjusting vertical height and horizontal deflection according to an embodiment of the present invention and FIG. 4 is an exploded view typically showing the device for adjusting vertical height and horizontal deflection of FIG. 3.

Figure 5:
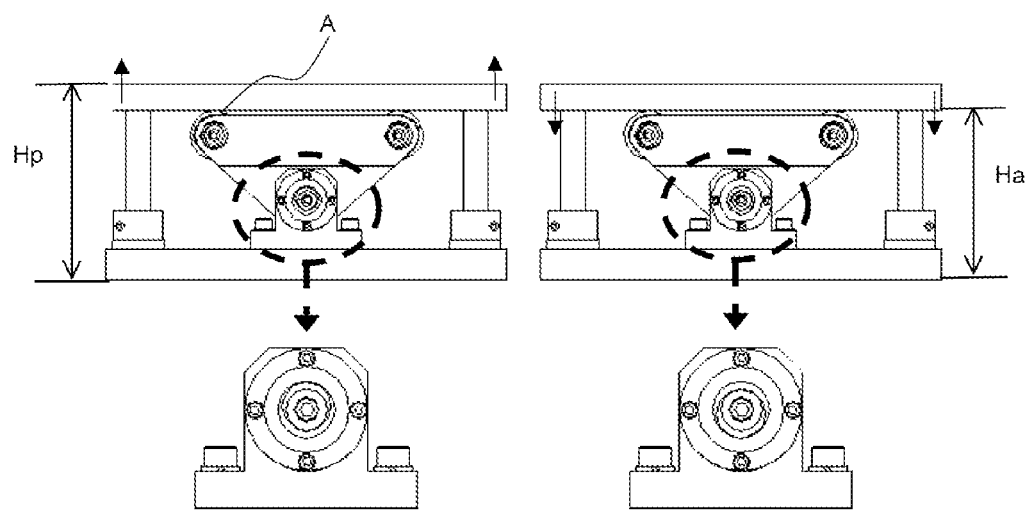
FIG. 5 is a typical view showing the operation of the device for adjusting vertical height and horizontal deflection of FIG. 3.

In addition, FIG. 5 is a typical view showing the operation of the device for adjusting vertical height and horizontal deflection of FIG. 3.

Referring to these drawings, the device for adjusting vertical height and horizontal deflection 600 includes a lower plate 300 fixed to a floor, an upper plate 310, vertical height and horizontal deflection of which are adjusted, two variable posts 320a and 320b connected to the upper end of the lower plate 300 and the lower end of the upper plate 310, and a height adjustment unit 400.

The lower end of the height adjustment unit 400 is fixedly disposed above the lower plate 300 and the upper end of the height adjustment unit 400 is disposed at the lower end of the upper plate 310 in a line contact fashion A. At the line contact portion, the height adjustment unit 400 adjusts vertical height and horizontal deflection of the upper plate 310.

The variable posts 320a and 320b are mounted around the height adjustment unit 400 at opposite sides of the height adjustment unit 400. The variable posts 320a and 320b include fixing parts 330a and 330b for fixing height of corresponding portions of the upper plate 310 changed by the height adjustment unit 400.

The fixing parts 330a and 330b are mounted to the lower ends of the variable posts 320a and 320b adjacent to the lower plate 300 to constitute a clamp lock structure.

In addition, the height adjustment unit 400 includes a pair of support parts 410a fixed to the top of the lower plate 300 in a frontward and rearward direction, an inverse-triangular hinge part 420 disposed between the support parts 410a, an eccentric cam 430 mounted to have a structure for connecting a lower angular point of the hinge part 420 and the support parts 410a, and two pairs of free rotary parts 440a, 440b, 440c, and 440d mounted at upper angular points of the hinge part 420.

During rotation of the eccentric cam 430, the eccentric cam 430 induces vertical movement of the hinge part 420 and change in height of the free rotary parts 440a, 440b, 440c, and 440d. The free rotary parts 440a, 440b, 440c, and 440d are connected to the upper plate 310 in a line contact fashion.

In addition, the eccentric cam 430 is configured to have a structure including a follower link 432, bearings 434, and a shaft 436. A driving handle (not shown) is mounted at the eccentric cam 430.

The driving handle is connected to the shaft 436 of the eccentric cam 430 via a worm and a worm gear. When the shaft 436 of the eccentric cam 430 makes one rotation, therefore, the driving handle makes more than one rotation.

The free rotary part 440c includes a pair of bearings 442c disposed at the lower end of the upper plate 310 in a contact fashion and a shaft 444 for connecting the bearings 442c to the upper angular points of the hinge part 420.

Two gauges 450a and 450b are mounted around the height adjustment unit 400 at opposite sides of the height adjustment unit 400 to indicate height of the upper plate 310 at portions at which the gauges are mounted.

The variable post 320b and the gauge 450b are located at the left side of the height adjustment unit 400. The variable post 320a and the gauge 450a are located at the right side of the height adjustment unit 400.

In a case in which it is necessary to change a height Hp of the upper plate 310 to a set height Ha without horizontal deflection, therefore, the height adjustment unit 400 is adjusted to change height of the variable post 320b such that height indicated by the gauge 450b becomes the set height Ha and then the variable post 320b is fixed. Subsequently, the height adjustment unit 400 is adjusted again to change the height of the variable post 320a such that height indicated by the gauge 450a becomes the set height Ha and then the variable post 320a is fixed.

The gauge 450b is a dial gauge. The lower end of the gauge 450b is inserted through a through hole of the upper plate 310 such that the lower end of the gauge 450b is connected to the upper end of a load unit 452. The load unit 452 is connected to the lower plate 300.

Even in a case in which only one portion is manipulated using the hinge part 420 and the free rotary part 440c, therefore, it is possible to adjust vertical height and horizontal deflection and to perform a tilting function. In addition, it is possible to minutely adjust height using the worm gear and the shaft 436 of the eccentric cam.

Furthermore, it is possible to check vertical height and horizontal deflection in real time using the dial gauge 450*b* and, at the same time, to minimize adjustment time, thereby improving user convenience. In addition, the variable post 320*a* is fixed using the clamp lock 330*a*. When the variable post 320*a* is fixed after adjustment of the vertical height and horizontal deflection, therefore, change in height of the variable post does not occur.

Meanwhile, FIG. 5 shows a driving method of a horizontality adjustment optimizing structure. Referring to FIG. 5 together with FIGS. 3 and 4, the shaft 436 of the eccentric cam is driven to decide a radius of rotation. As a result, a vertical movement width of the hinge part 420 is decided. The vertical movement width of the hinge part 420 may be checked in real time using the dial gauge 450*b*.

In addition, the bearings 434 are provided at the hinge part 420 and the bearings 434 are disposed in line contact A with the upper plate 310. Consequently, the hinge part 420 may be moved vertically and, at the same time, may be tilted. Furthermore, after adjustment of the vertical height and horizontal deflection, the variable post 320*a* is fixed using the clamp lock 330*a*. Consequently, change in height of the variable post does not occur.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Industrial Applicability

As is apparent from the above description, it is possible for the device for adjusting vertical height and horizontal deflection according to the present invention to simultaneously adjust vertical height and horizontal deflection through simple manipulation, thereby improving manufacturing efficiency.

In addition, it is possible for the device for adjusting vertical height and horizontal deflection according to the present invention to optimally adjust vertical height and horizontal deflection of the device, thereby minimizing vertical height and horizontal deflection adjustment time and equalizing quality of products manufactured by the device.

The invention claimed:

1. A device for simultaneously adjusting vertical height and horizontal deflection comprising:
    a lower plate fixed to a floor;
    an upper plate, vertical height and horizontal deflection of which are adjusted;
    one or more variable posts connected to an upper end of the lower plate and a lower end of the upper plate; and
    a height adjustment unit comprising
        a pair of support parts fixed to a top of the lower plate in a frontward and rearward direction,
        a polygonal hinge part disposed between the support parts,
        an eccentric cam mounted to have a structure for connecting a lower angular point of the hinge part and the support parts, the eccentric cam inducing vertical movement of the hinge part and change in height of free rotary parts during rotation of the eccentric cam, and
        two pairs of free rotary parts mounted at upper angular points of the hinge part, the free rotary parts being disposed at the upper plate in a line contact fashion,
    wherein a lower end of the height adjustment unit is fixedly disposed above the lower plate, an upper end of the height adjustment unit is disposed at the lower end of the upper plate in a line contact fashion, and the height adjustment unit adjusts vertical height and horizontal deflection of the upper plate at the line contact portion.

2. The device for adjusting vertical height and horizontal deflection according to claim 1, wherein one or more variable posts are mounted around the height adjustment unit at each side of the height adjustment unit.

3. The device for adjusting vertical height and horizontal deflection according to claim 1, wherein each variable post further comprises a fixing part for fixing height of a corresponding portion of the upper plate changed by the height adjustment unit.

4. The device for adjusting vertical height and horizontal deflection according to claim 3, wherein the fixing part is a clamp lock mounted to a lower end of a corresponding one of the variable posts adjacent to the lower plate.

5. The device for adjusting vertical height and horizontal deflection according to claim 1, wherein the eccentric cam is configured to have a structure including a follower link, bearings, and a shaft.

6. The device for adjusting vertical height and horizontal deflection according to claim 1, wherein a driving handle is further mounted at the eccentric cam.

7. The device for adjusting vertical height and horizontal deflection according to claim 6, wherein the driving handle is connected to a shaft of the eccentric cam via a worm and a worm gear.

8. The device for adjusting vertical height and horizontal deflection according to claim 7, wherein, when the shaft of the eccentric cam makes one rotation, the driving handle makes more than one rotation.

9. The device for adjusting vertical height and horizontal deflection according to claim 1, wherein each free rotary part comprises a pair of bearings disposed at the lower end of the upper plate in a contact fashion and a shaft for connecting the bearings to the upper angular points of the hinge part.

10. The device for adjusting vertical height and horizontal deflection according to claim 1, further comprising one or more gauges mounted at opposite sides of the height adjustment unit to indicate height of the upper plate at portions at which the gauges are mounted.

11. The device for adjusting vertical height and horizontal deflection according to claim 10, wherein two gauges are mounted around the height adjustment unit at the opposite sides of the height adjustment unit.

12. The device for adjusting vertical height and horizontal deflection according to claim 1, wherein a variable post (PL) and a gauge (GL) are located at a left side of the height adjustment unit and a variable post (PR) and a gauge (GR) are located at a right side of the height adjustment unit.

13. The device for adjusting vertical height and horizontal deflection according to claim 12, wherein, in a case in which it is necessary to change a height (Hp) of the upper plate to a set height (Ha) without horizontal deflection, the height adjustment unit is adjusted to change height of the variable post (PL) such that height indicated by the gauge (GL) becomes the set height (Ha) and then the variable post (PL) is fixed and, subsequently, the height adjustment unit is adjusted again to change height of the variable post (PR) such that height indicated by the gauge (GR) becomes the set height (Ha) and then the variable post (PR) is fixed.

14. The device for adjusting vertical height and horizontal deflection according to claim 10, wherein each gauge is a dial gauge.

15. The device for adjusting vertical height and horizontal deflection according to claim 10, wherein a lower end of each gauge is fixed to the upper plate and a load unit is connected to the lower plate.

16. The device for adjusting vertical height and horizontal deflection according to claim 1, further comprising:
- a beading device loaded at a top of an upper plate of the device for adjusting vertical height and horizontal deflection to fix beading of a cylindrical battery.

17. A method of manufacturing a cylindrical battery, the method comprising:
- using the device for adjusting vertical height and horizontal deflection according to claim 16 to fix beading of the cylindrical battery.

* * * * *